United States Patent
Kim et al.

[11] Patent Number: 5,864,802
[45] Date of Patent: Jan. 26, 1999

[54] DIGITAL AUDIO ENCODING METHOD UTILIZING LOOK-UP TABLE AND DEVICE THEREOF

[75] Inventors: Do-hyung Kim, Yongin; Yeon-bae Kim, Suwon; Sang-wook Kim; Yang-seock Seo, both of Seoul, all of Rep. of Korea

[73] Assignee: Samsung Electronics Co., Ltd., Kyungki-Do, Rep. of Korea

[21] Appl. No.: 717,610

[22] Filed: Sep. 23, 1996

[30] Foreign Application Priority Data

Sep. 22, 1995 [KR] Rep. of Korea ............... 1995-31352
Sep. 22, 1995 [KR] Rep. of Korea ............... 1995-31355

[51] Int. Cl.$^6$ ............................................. G10L 3/02
[52] U.S. Cl. ................................. 704/230; 704/229
[58] Field of Search ............................... 704/229, 230, 704/500–504

[56] References Cited

U.S. PATENT DOCUMENTS

| | | | |
|---|---|---|---|
| 4,896,362 | 1/1990 | Velhuis et al. | 704/229 |
| 4,899,384 | 2/1990 | Crouse et al. | 704/229 |
| 4,903,301 | 2/1990 | Kondo et al. | 704/501 |
| 4,926,482 | 5/1990 | Frost et al. | 704/229 |
| 5,042,069 | 8/1991 | Chhatwal et al. | 704/229 |
| 5,222,189 | 6/1993 | Fielder . | |
| 5,263,088 | 11/1993 | Hazu et al. | 704/229 |
| 5,353,375 | 10/1994 | Goto et al. | 704/229 |
| 5,583,962 | 12/1996 | Davis et al. | 704/229 |
| 5,649,053 | 7/1997 | Kim | 704/229 |

*Primary Examiner*—David R. Hudspeth
*Assistant Examiner*—Michael N. Opsasnick
*Attorney, Agent, or Firm*—Leydig, Voit & Mayer, Ltd.

[57] ABSTRACT

A digital audio encoding method and apparatus using a look-up table includes preparing allocated bits for each frequency band of an input audio signal according to the characteristics of the input audio signal using a look-up table. A time domain audio signal is divided into a number of equal frequency bands. The addresses of the look-up table are decided according to the relative magnitudes of the audio signal characteristics acquired for the divided frequency bands. Bits corresponding to the addresses for the frequency bands are allocated and quantized. A quantized audio signal is formed from the quantized bits as a bitstream. Since the delay in operation time for the encoding apparatus is considerably reduced, real-time processing of the encoding apparatus can be realized in a hardware implementation.

17 Claims, 9 Drawing Sheets

DIGITAL AUDIO ENCODING METHOD UTILIZING LOOK-UP TABLE AND DEVICE THEREOF

BACKGROUND OF THE INVENTION

The present invention relates to a digital audio encoding method and device thereof, and more particularly, to a digital audio encoding method utilizing a look-up table (LUT) and device thereof.

Current communication technology converts analog data into digital data. To meet such a trend, a digital transmission is becoming necessary in all audio devices and even in audio data transmission systems. Such digital audio data transmission is stronger against ambient noise than existing analog transmission methods. Furthermore, sound quality can be reproduced as clearly as in a compact disc (CD). However, as the quantity of data to be transmitted increases, many problems are involved in the capacity of memories and/or transmission channels.

To solve such problems, compression technology is necessary. The target of audio compression technology is to reproduce a sound to be the same as the original sound. The compressed sound data is transmitted after compressing an original sound and it hears them again after decompressing the transmitted sound data.

At present, such technology is being rapidly developed all over the world. At the forefront of this technology is Sony Corp. with its mini disc (MD) made in Japan in 1992. Phillips Corp. is also at the forefront of this technology with their digital compact disc (DCC). In case of the MD, for example, the size thereof is relatively smaller than that of the existing CD while it reproduces sound to CD level quality. Also, the MD can store much bigger amounts of data than the CD with a compression ratio of about 5:1. Further, the MD is resistant to external shock.

On the other hand, with respect to video, the International Standard Organization for a digital compression encoding technology, namely, MPEG (Moving Picture Expert Group) was established. The MPEG is largely classified by three parts, that is, system, video and audio parts. Among them, the audio part is subdivided into three layers.

The MPEG compares, analyzes and tests various low-transmission-rate encoding technologies proposed to enact the international standards for the coded expression of moving pictures and the audio signals corresponding thereto. If such international standards are established, the data must be encoded and stored to meet such standards for all digital storage media. Here, the digital storage media include a compact disk-read only memory (CD-ROM), a digital audio tape (DAT), a magneto-optical disc (MOD) and a computer disc (for example, hard disk drive).

In compression encoding of an audio signal, a psychoacoustic model of a human is generally utilized. Using a masking phenomenon and critical bands among the acoustic characteristics, an inaudible signal is removed and only a requisite signal is coded and bits are allocated thereto, so that a sound quality of almost the same level as that of the original sound is obtained even if the signal is coded with fewer bits than those of the original signal.

Here, the masking phenomenon is a phenomenon in which a human does not sense a sound at all by masking a signal using another signal due to an interference between audio signals. Also, a critical band by which a sound frequency is distinguished by a human is generally divided into twenty-four bands. The higher the frequency is, the wider the bands become on a logarithmic scale. Accordingly, it is not easy to distinguish a higher frequency signal from a lower frequency signal.

To allocate a bit using such acoustic characteristics, a signal-to-noise ratio (SNR) and a signal-to-mask ratio (SMR) are obtained and then a mask-to-noise ratio(MNR) must be calculated therefrom. Here, a mask level is a minimum signal level which is insensible by a human. Accordingly, it is not necessary to allocate a bit to a signal below this mask level.

A final MNR is obtained through the above process and then a bit is repeatedly allocated based on the final MNR. However, a lot of operation time could be required during such a process, which means that a real time delay is increased in an encoder. Thus, it becomes necessary to reduce complexity of the operations.

Now, referring FIG. 1, a general MPEG audio encoding apparatus will be described briefly.

A frequency mapping part 11 converts audio data of a time domain into that of a frequency domain having 32 equal bands by using a band analysis filter. At this time, each band includes twelve samples in case of a layer I and thirty six samples in case of a layer II. On the other hand, since the number of a scale factor is sixty four in total, the number of bits necessary for encoding this information is six bits. There is a little difference between encoding methods depending on layers. In the layer I, among twelve samples included in each band, the largest value is obtained and the same or slightly larger value is chosen as a scale factor. In the layer II, since three scale factors exist in each band, a similarity in the respective scale factors is investigated to then decide how many among three scale factors are to be coded. In other words, the number of scale factors to be coded is different depending on the range of a difference value between adjacent scale factors. Accordingly, additional information is needed in selecting a scale factor, unlike in the layer I, where the information is coded with 2 bits.

A psychoacoustics model 13 is the part having the largest operation complexity in the encoding apparatus. A final output value of the psychoacoustics model is an SMR of each band as a standard of a bit allocation. The SMR value is calculated by a series of steps as follows. An audio signal of a time domain is converted into the frequency domain by a fast Fourier transform (FFT) in a first step. A sound pressure level for each band is calculated in a second step. An absolute threshold is calculated in a third step. Voiced and voiceless sound components of an audio signal are decided in a fourth step. A masker is decided in a fifth step. An absolute threshold of each band is calculated in a sixth step. A total absolute threshold is calculated in a seventh step. A minimum absolute threshold of each band is calculated in a eighth step. An SMR value of each band is calculated in a ninth step.

In a bit allocating and quantizing part 15, first, in a bit allocating step, the quantity of allocated bits of each is obtained by repeatedly performing the following steps in sequence based on the SMR value obtained by the psychoacoustics model 13. In a first step a, an initially allocated bit is set to zero (0). In a second step, an MNR value of each band is obtained. At this time, the MNR value is obtained by subtracting the SMR value from the SNR value. In a third step, the band having the minimum MNR value among MNRs obtained for the respective bands is searched and then the number of allocated bits is increased by 1. In a fourth step, the second and third steps are repeatedly performed with respect to the remaining bands if the required number of bits is not exceeded in a fourth step.

On the other hand, the quantization process is performed through the following steps in sequence. In a first step, samples of each band are divided by a scale factor to set the value obtained thereby to an X. In a second step, a value of A*X+B is calculated (Here, A and B are predetermined values.). In a third step, among the calculated values, the number of allocated bits obtained from the bit allocating step is obtained. The most significant bit (MSB) is reversed in a fourth step.

As the mentioned above, since the conventional digital audio encoding apparatus utilizes a psychoacoustics model, a nine-step process is necessary for obtaining the SMR value. Accordingly, the complexity of the operation increases, which exerts a big influence in overall performance time. Also, an MNR value is calculated again using the SMR values obtained by such a method. Time delay also occurs in this procedure due to repeated performance of the bit allocation loops based on the thus-calculated MNR.

As the result of actual experiment, it was understood from the following Table 1 that the complexity of the operation in the psychoacoustics model generation process and bit allocation process is high, i.e., about 49.9% of the performance time of the overall encoding process.

TABLE 1

| Overall performance time of encoding apparatus (1/60 sec) | Psychoacoustic model & bit allocation process (1/60 sec) | Rate (%) |
|---|---|---|
| 22662 | 11590 | 49.9 |

SUMMARY OF THE INVENTION

Therefore, to solve the above-described problems, it is an object of the present invention to provide a digital audio encoding method for allocating bits wherein bit allocation quantity depending on input audio signal characteristics is performed using a pre-prepared look-up table, which is compatible for an existing MPEG to reduce the delay time required for audio compression encoding, and then bits are allocated using the look-up table.

It is another object of the present invention to provide an apparatus suitable for realizing the digital audio encoding method.

To accomplish the first object, there is provided a digital audio encoding method comprising the steps of: preparing allocated bits for each frequency band according to the characteristics of an input audio signal using a look-up table; dividing the audio signal of a time domain into equal frequency bands of a predetermined number; deciding the address of the look-up table according to the intensity sequence of the audio signal characteristics acquired for the divided frequency bands; allocating bits corresponding to the decided address for each frequency band in the look-up table and quantizing the same; and forming the quantized audio signal as a bitstream.

To achieve the second object, there is provided a digital audio encoding apparatus having look-up table prepared for the relationship of an allocated bit with respect to each frequency band according to characteristics of an input audio signal comprising: a frequency mapping part for dividing an audio signal of a time domain into an equal frequency band of a predetermined number; a characteristic acquiring part for deciding the address of the look-up table according to the intensity sequence of the characteristics of the audio signal acquired for the divided frequency band; a bit allocating and quantizing part for allocating bits corresponding to the address to each frequency band in the look-up table and quantizing the same; and a frame packing part for forming said quantized audio signal as a bitstream.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinbelow, a preferred embodiment of the present invention will be described referring to the accompanying drawings.

Figure 1:
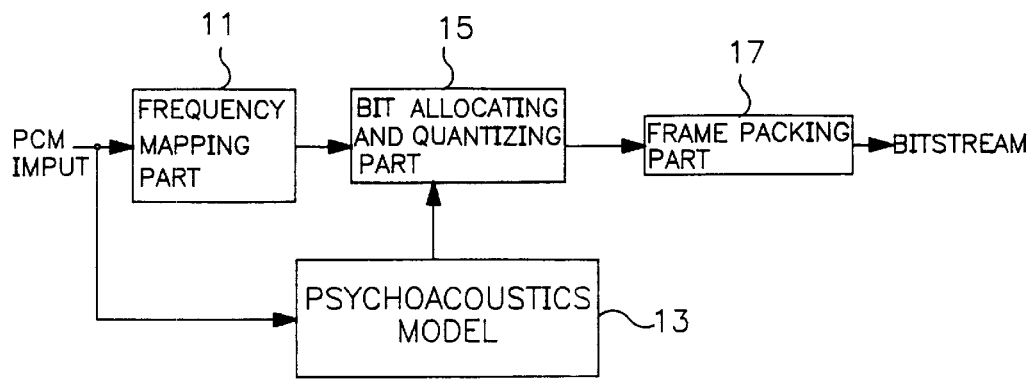
FIG. 1 is a block diagram showing a general MPEG audio encoder.
Figure 12:
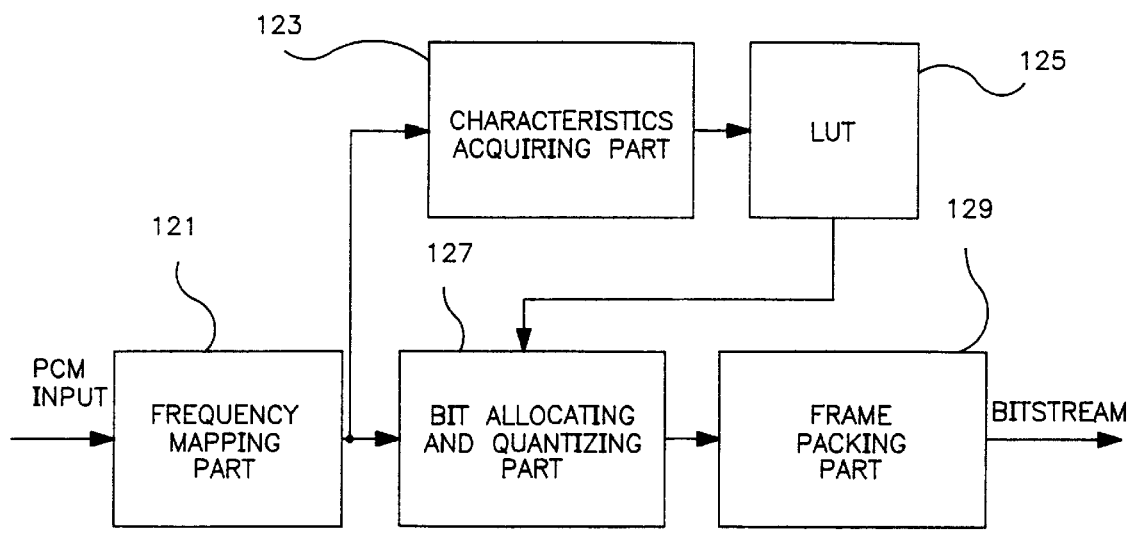
FIG. 12 is a block diagram showing a digital audio encoding apparatus utilizing a look-up table according to the present invention.

A bit allocation method according to the present invention allocate bits using a look-up table (LUT) prepared in advance as an essential segment. The LUT is used in place of the psychoacoustics model part 13 and bit allocating and quantizing part 15 of the prior art device depicted in FIG. 1. A digital audio encoding apparatus proposed by the present invention is shown in FIG. 12. Now, a process of generating an LUT necessary for the bit allocation will be described.

The LUT is a table for deciding the quantity of allocated bits for each band and is used for reducing the time necessary for the bit allocation to a minimum level. For this purpose, since the overall performance time is reduced by removing the steps analyzing input signal in a frequency domain, such as a step of obtaining the FFT used for psychoacoustics model or the power distribution, characteristics of a time domain for an input signal are considered. In other words, an input signal is not interpreted in the frequency domain but the characteristics thereof are found in the time domain, and the found values are used as the standard for preparing the LUT.

In the first embodiment of the present invention, these characteristics are prescribed as a variance, a scale factor and an average square root. Of course, such characteristics are obtained by the band analysis filter of the frequency mapping part 11 shown in FIG. 1 and are available in deciding LUT addresses. Such characteristics will be first described briefly, and the method of adopting the characteristics to an encoding algorithm will then be described.

Figures 2A, 2B:
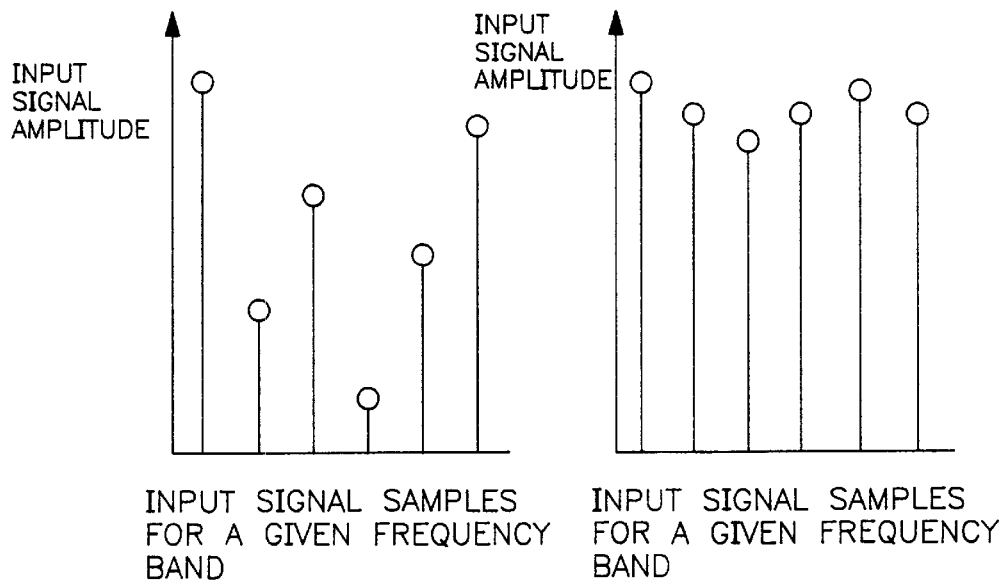
FIGS. 2A and 2B are graphs showing a variance of an input audio signal, showing large and small dispersions, respectively.

First, the variance characteristic is a factor that tells how closely input signals are distributed from the average. In other words, as shown in FIG. 2A, when the variance is large, a dynamic range for an input signal increases and a lot of bits must be allocated in order to reduce quantization noise. As shown in FIG. 2B, when the variance is small, it does not matter even if an allocated bit share is small. Generally, since the bands to which a lot of bits are actually allocated are those of a low frequency, i.e., bands 0 through 7, among 32 bands, the variance also has a large value in those bands on the whole. In the present invention, to obtain the variance, the input signal passes a band analysis filter to have twelve samples for each band of thirty-two bands. First, a mean (m(sb)) and a square mean (ms(sb)) are obtained for twelve samples, the variance (v(sb)) of each band is obtained by the following equation.

$$v(sb) = ms(sb) - m(sb)^2 \quad (1)$$

Second, a mean square root (rms(sb)) characteristic is a similar concept as that of the mean. However, the mean for the input signal is zero in case of a sine or cosine wave, which is meaningless. Thus, a mean square root could be one of the characteristics, which is obtained by averaging a square of the input signal and then obtaining the square root of the averaged value. In other words, this is the same as the square root of the square mean obtained in obtaining the variance. The mean square root (rms(sb)) is expressed in the following equation (2).

$$rms(sb) = \sqrt{ms(sb)} \quad (2)$$

Here, the relation between the mean square root and the variance will now be analyzed. If the mean of a band is nearly zero (0), the variance is the same as a square mean according to the above equation (1), so that the two characteristics will have a constant linearity. Also, generally, the larger the mean of signals, the larger the mean square root is and the larger the power is, by which the relation with an allocated bit quantity can be found.

Third, characteristics of a scale factor will now be described. The scale factor is used in calculating a mask level of each band by obtaining the power of the band in the psychoacoustics model. Generally, more bits should be allocated if the power of an input signal is larger. The power in the frequency domain can be determined based on the size of input signal values in the time domain. Considering such characteristics, the largest sample value for each band is considered as the power of the band. The sample value is called a scale factor. If a scale factor of an arbitrary band is large, it is considered that the power of the band is large. The scale factor is also used to normalize the value of each band during a quantization process.

In preparing the LUT using the characteristics of the audio signals, it is important to know how to use the characteristics in finding the addresses of the LUT. In other words, considering all of such characteristics, the address of the LUT should be searched and the allocated bit quantity corresponding thereto should be decided. For the purpose, in the present invention, the number of all possible cases of three characteristics is considered. The characteristics are arranged in the order of the magnitude for each band, and the LUT is prepared according to the magnitude order. In such a case, with respect to one band, since three characteristics are arranged in sequence from 0 through 31, the number of cases are 32768 ($=32^3$) in total. 32768 cases should be considered for each band.

Also, all 32768 cases are given a number and the allocated bit quantity for each case is investigated to decide the most frequent value as the allocated bit quantity for the band. This method is reliable because it simply follows in the order of the magnitude, regardless of the range of the maximum or minimum value for any audio data.

Then, the method of preparing the LUT will be explained using the above-described method.

Figure 3:
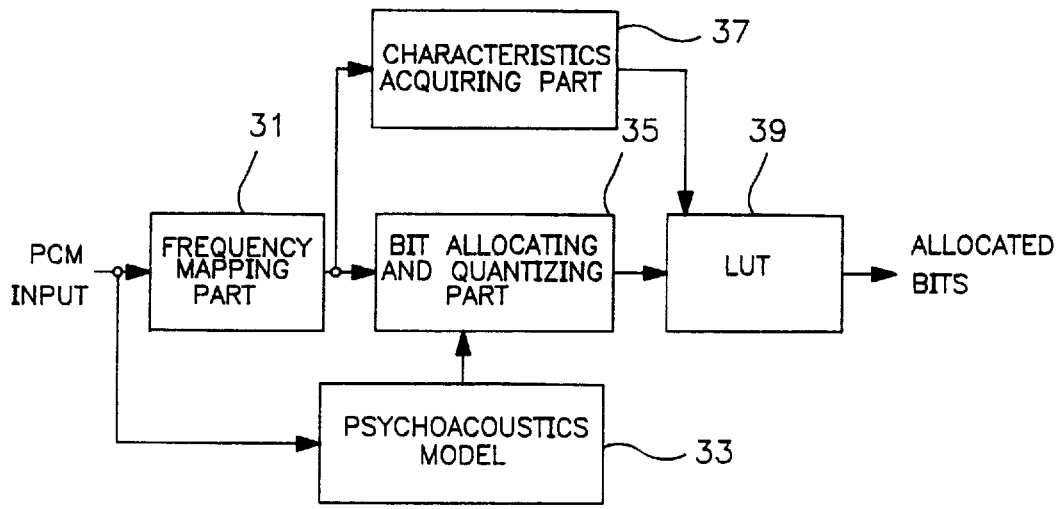
FIG. 3A is a flow chart illustrating a method for generating a look-up table for encoding an audio signal according to a first embodiment of the present invention.
FIG. 3B is a flow chart illustrating a method for encoding an audio signal according to a first embodiment of the present invention.
Figure 4:
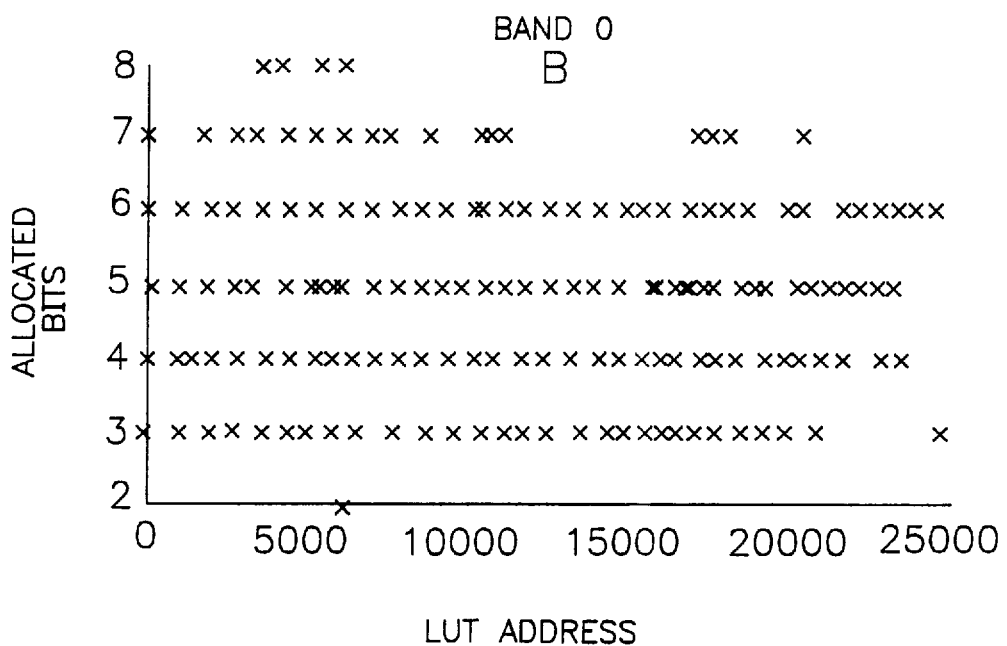
FIG. 4 shows the distribution of allocated bits in the look-up table for a band 0 according to addresses.
Figure 3A:
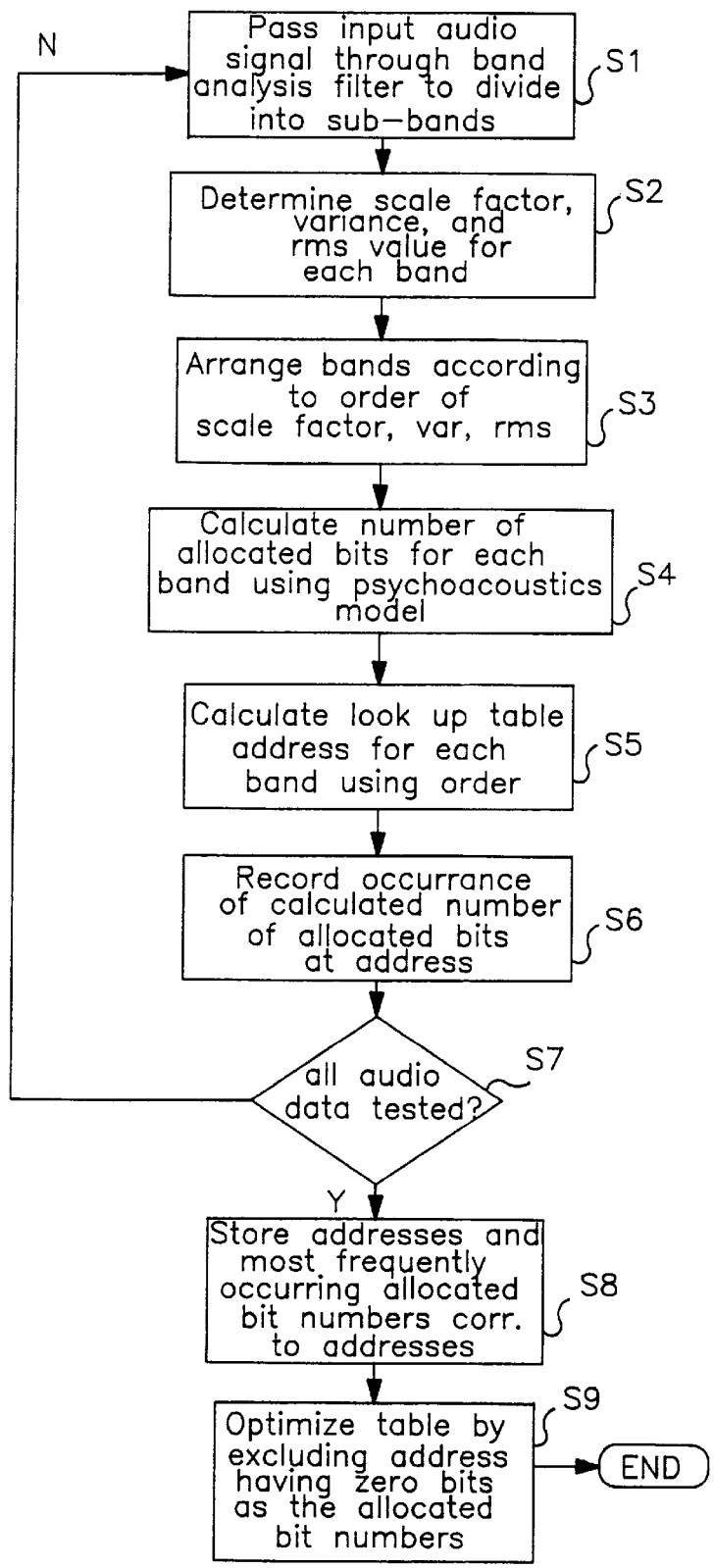

FIG. 3A is a drawing for explaining the method of preparing the LUT. First, in step S1 input audio data is allowed to pass through the band analysis filter of the frequency mapping part 31 and then the maximum value of each band is obtained, which is called a scale factor (sf). In step S2, the variance and mean square root are obtained for each band using the first and second equations and then, in step S3, the three characteristics are arranged in the order of intensity. On the other hand, in step S4, a psychoacoustics model 33 is applied for an input audio data to obtain an SMR and then an allocated bit quantity for each band is obtained based on the SMR. In step S6–S8, the LUT is prepared based on the allocated bit quantity and the order of three characteristics for each band. In other words, for a band 0, if the bit quantity allocated by the psychoacoustics model is 4 and the order of the three characteristics of the band is 2-3-1, the number of occurrences is increased by 1 in the four-bit column of the corresponding address. Such a process is repeatedly performed with respect to twelve audio data in the present invention. Then, the most frequent bit quantity is designated as the allocated bit quantity for the band. The more the audio data is used in the statistics, the more elaborate the LUT is generated.

On the other hand, the method of obtaining the address (addr) as the order of three characteristics for each band can be expressed in the following equation (3).

$$addr = v \times 32^2 + rms \times 32^1 + sf \times 32^0 \quad (3)$$

Here, reference letters v, rms and sf represent each order of three characteristics, i.e., a variance, a mean square root and a scale factor. The following Table 2 indicates the method of calculating the address of the LUT as the order of the three characteristics for each band.

TABLE 2

| Address | Variance order | Mean square root order | scale factor order |
|---|---|---|---|
| 0 | 0 | 0 | 0 |
| 1 | 0 | 0 | 1 |
| . | . | . | . |
| . | . | . | . |
| 16384 | 16 | 0 | 0 |
| 16385 | 16 | 0 | 1 |
| . | . | . | . |
| . | . | . | . |
| 32766 | 31 | 31 | 30 |
| 32767 | 31 | 31 | 31 |

On the other hand, the following table 3 expresses a middle generation step of LUT.

TABLE 3

| Address | Variance | Mean square root | scale factor | 0 | 1 | 2 | 3 | 4 |
|---|---|---|---|---|---|---|---|---|
| →Band 0 | | | | | | | | |
| 0 | 0 | 0 | 0 | 0 | 0 | 0 | 2594 | 6733 |
| . | . | . | . | . | . | . | . | . |
| 3212 | 3 | 4 | 12 | 0 | 4 | 100 | 2544 | 986 |
| . | . | . | . | . | . | . | . | . |
| 32767 | 31 | 31 | 31 | 9 | 0 | 1 | 0 | 0 |
| →Band 31 | | | | | | | | |
| 0 | 0 | 0 | 0 | 0 | 0 | 0 | 0 | 0 |
| . | . | . | . | . | . | . | . | . |
| 3212 | 3 | 4 | 12 | 68 | 79 | 120 | 0 | 0 |
| . | . | . | . | . | . | . | . | . |
| 32767 | 31 | 31 | 31 | 6832 | 2300 | 10 | 0 | 0 |

In the above Table 3, the bold numbers represent the most frequent numbers. For example, in the case of a band 0, if the orders of the variance, mean square root and scale factor are all zero (0), the number of occurrences is largest in case of allocating 4 bits. In this case, 4 bits are stored in the LUT with the address 0. The reason for storing the address in the LUT is that the address information is necessary because the 0-bit storing address is excluded during a LUT optimizing process. Also, if the variance, mean square root and scale factor are 3, 4 and 12 in their order, respectively, a 3-bit precharge circuit is occupied most frequently. In this case, 3 bits are input to the LUT with the address 3212 for storage. If there are two most frequent bit allocation band, the larger bit allocation is selected. It was proved by the experimental results that a difference between the actually allocated bit quantity and the required bit quantity can be reduced by doing so.

As indicated in the Table 3, on the other hand, three characteristics are on the whole distributed in the lower addresses for the lower order bands. For the higher band, the distribution of the characteristics moves to the higher addresses. In other words, the intensities of these three characteristics are large in lower frequencies, on the whole. Therefore, it is possible to apply only the characteristics to an audio encoding.

On the other hand, FIGS. 4 through 10 show the experimental results about the distribution of the allocated bits for the LUT address for several bands. This is an example of the statistical distribution result for 96 kbit/s of MPEG layer II. Although this result is not for the overall bands, it is evident that in the layer II, the allocated bits for the bands 3, 4 and 5 are more numerous for the lower addresses. Here, the lower addresses means that the intensities of the three characteristics are all large. In view of overall bands, the smaller intensities of these three characteristics correspond to fewer allocated bits. This phenomenon is more evident for the bands 3, 4 and 5.

Figure 11:
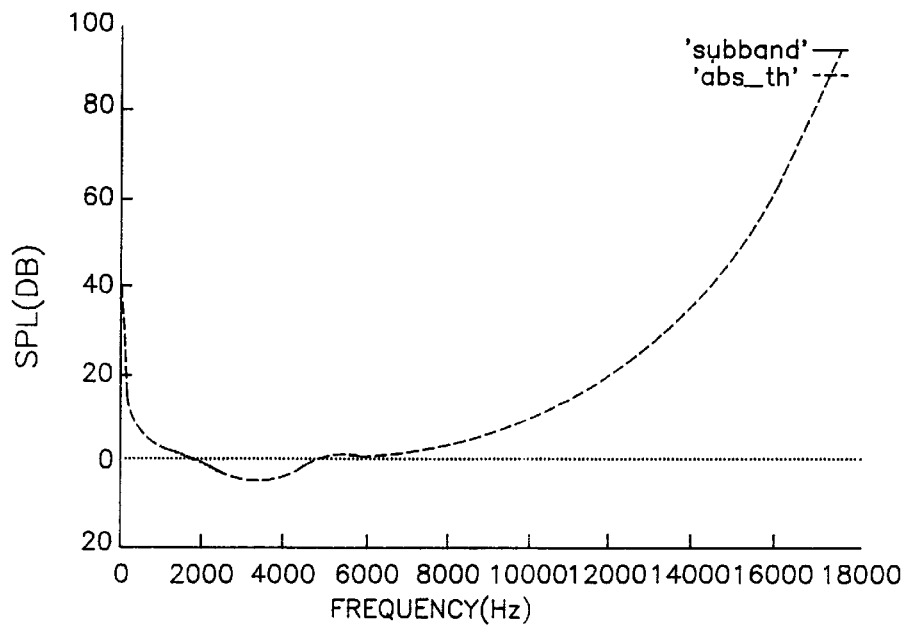
FIG. 11 is a graph showing a relationship between an absolute threshold and 32 bands in a frequency domain.

FIG. 11 is a graph showing relationship between an absolute threshold obtained from a psychoacoustics model of a human auditory system and 32 bands. A lot of bits are allocated to the most sensitively audible domain, i.e., the bands 3, 4 and 5 corresponding to 2 kHz~4 kHz where the absolute threshold is the lowest, so that a clean sound quality can be obtained.

And, in the present invention, in order to utilize the memory more efficiently by reducing the total size of the thus-obtained LUT, the LUT optimizing process is added. In other words, the address whose allocated bit quantity stored as the input of the LUT is 0 is excluded from the LUT, thereby greatly reducing the size of the LUT (step S9 in FIG. 3A). For example, in the case of the band 31 of the Table 3, since 0 bit is most frequently allocated to the addresses 0 and 32767, these addresses are not input to the table of the bands corresponding thereto. In adopting the thus-optimized LUT to the encoding process, if the address determined by the above three characteristics does not exist in the LUT, 0 bit is allocated to the band. Accordingly, the LUT also stores the address obtainable by three characteristics with the allocated bit quantity.

Now, the audio encoding using the prepared LUT will be described as follows.

Figure 3B:
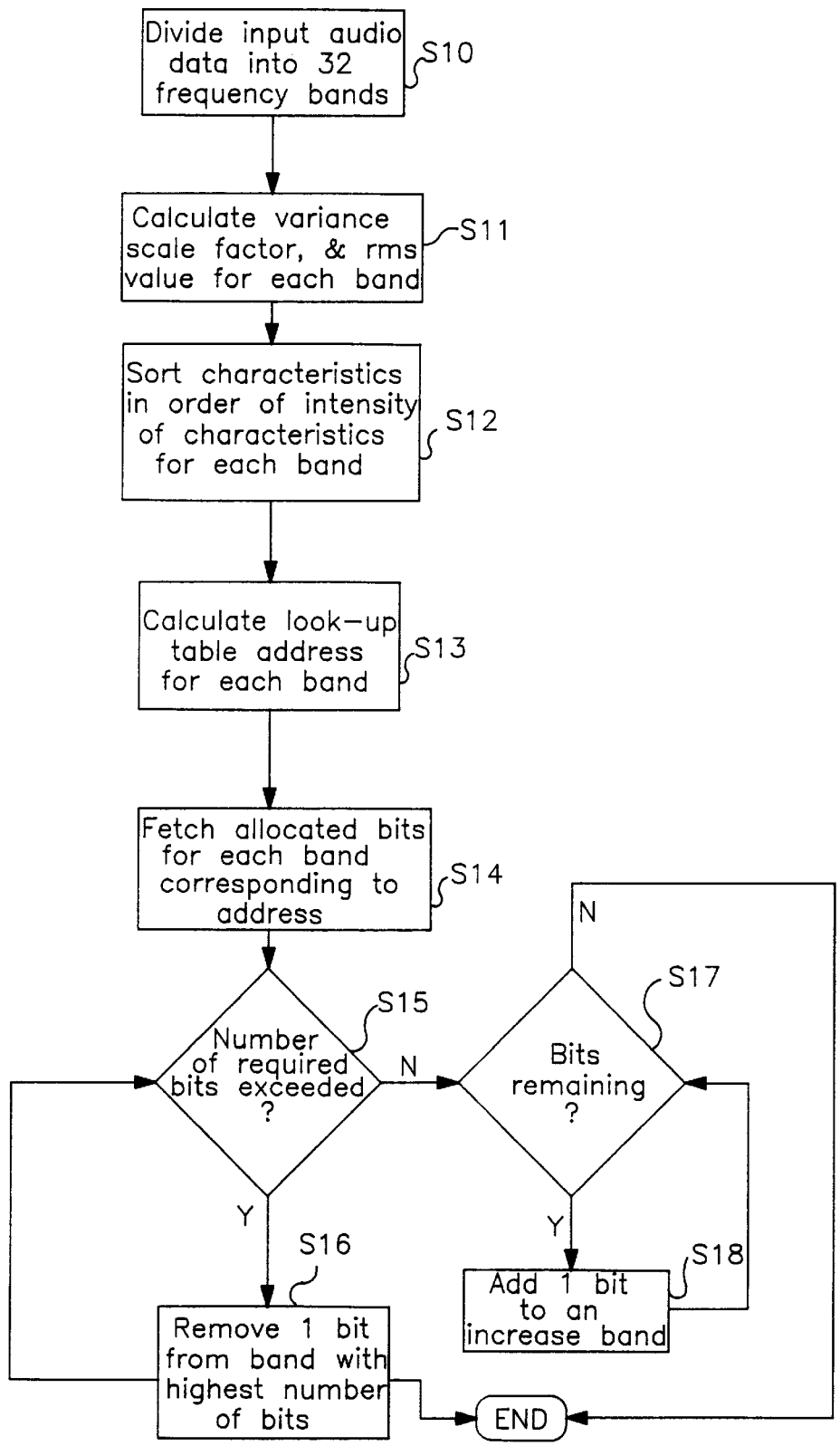
Figure 5:
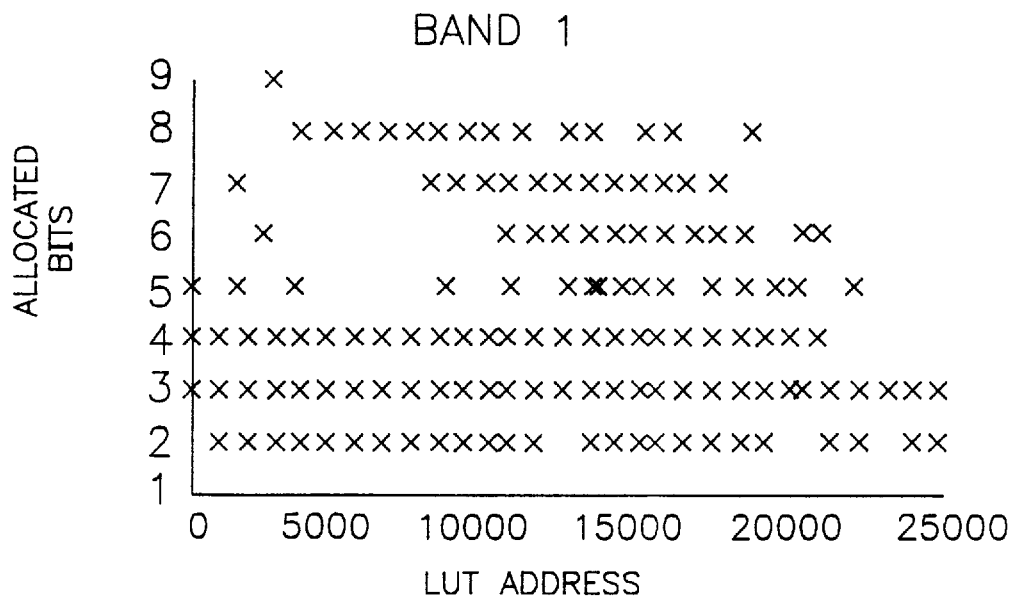
FIG. 5 shows the distribution of allocated bits in the look-up table for a band 1 according to addresses.
Figure 6:
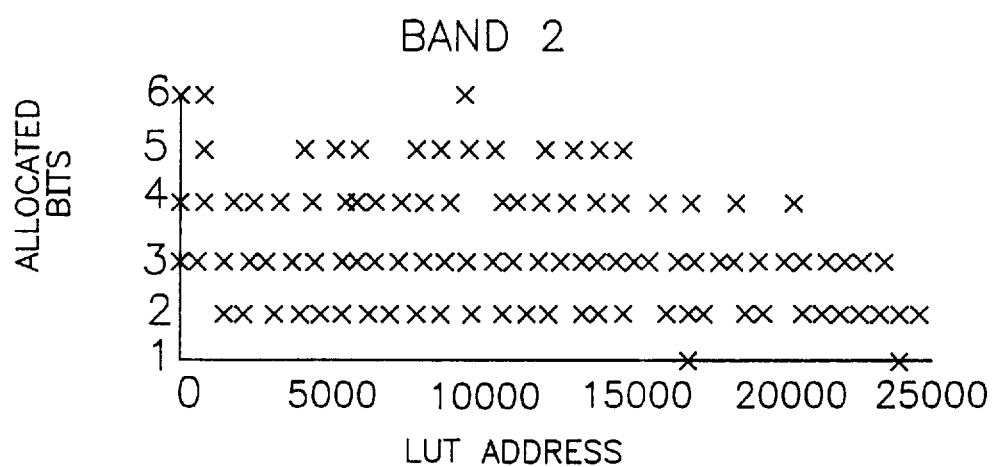
FIG. 6 shows the distribution of allocated bits in the look-up table for a band 2 according to addresses.
Figure 7:
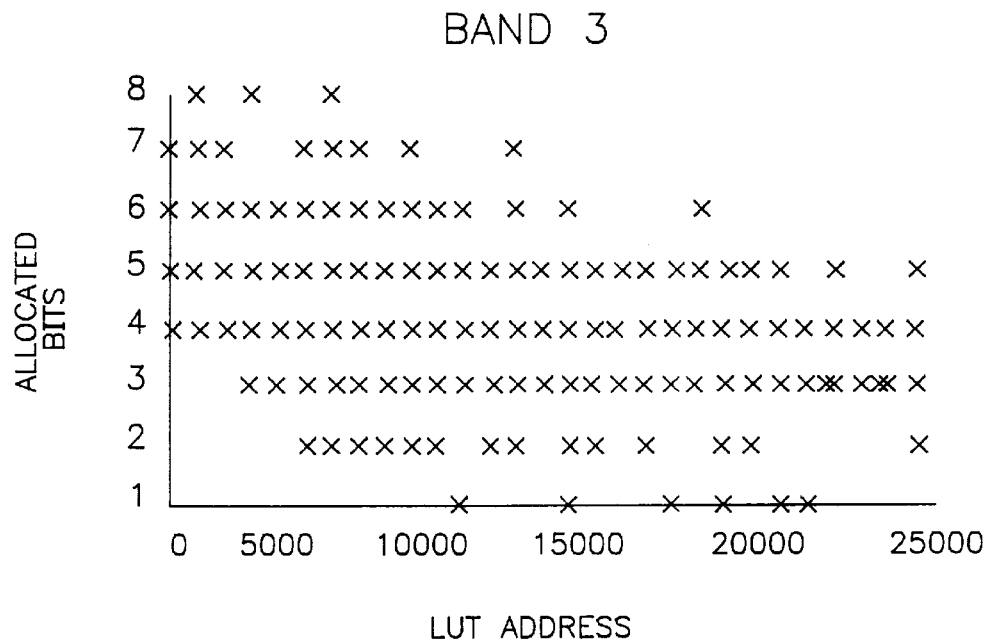
FIG. 7 shows the distribution of allocated bits in the look-up table for a band 3 according to addresses.
Figure 8:
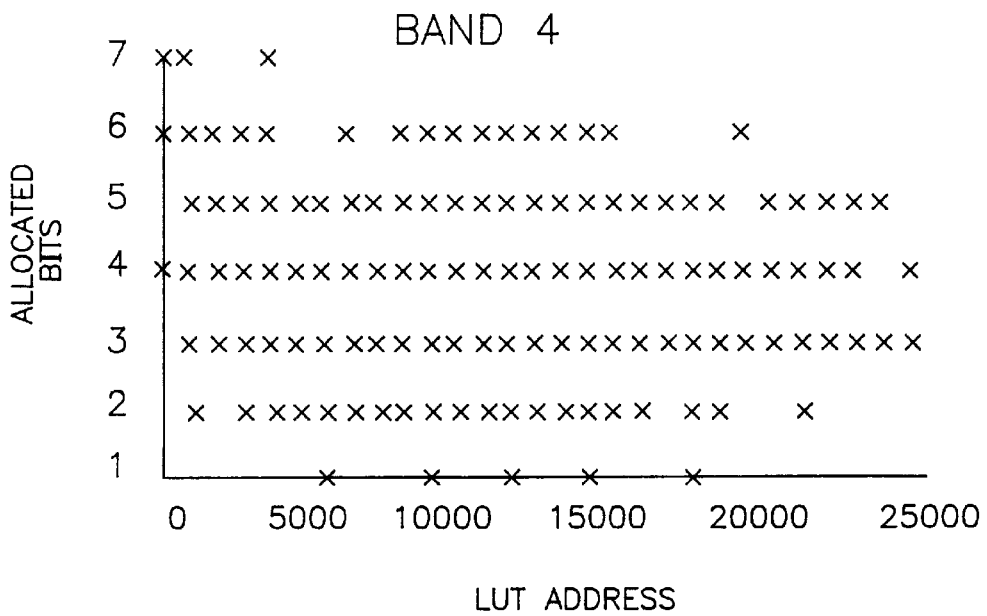
FIG. 8 shows the distribution of allocated bits in the look-up table for a band 4 according to addresses.
Figure 9:
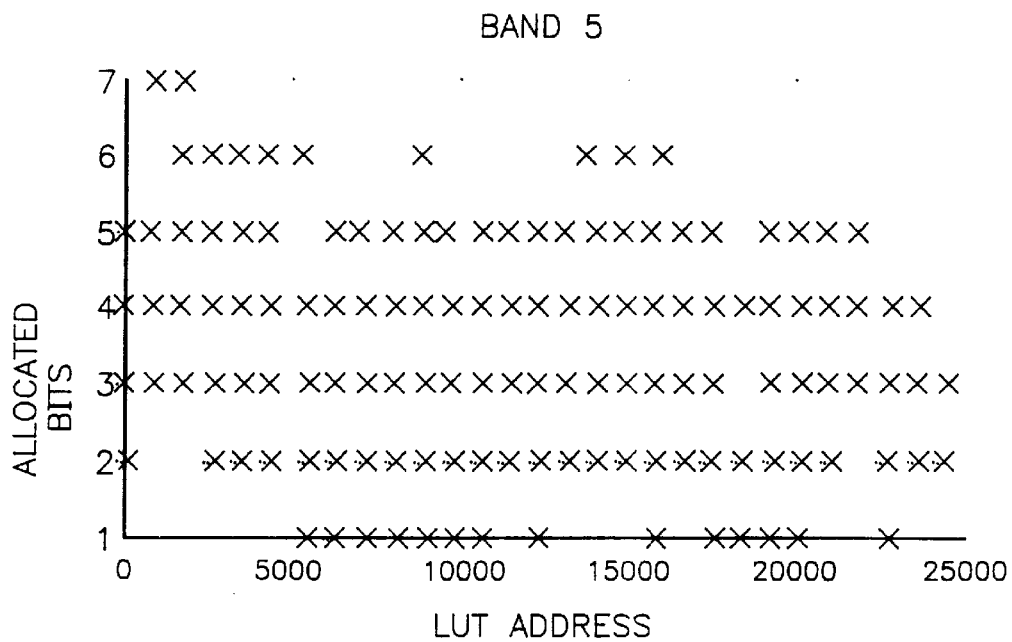
FIG. 9 shows the distribution of allocated bits in the look-up table for a band 5 according to addresses.
Figure 10:
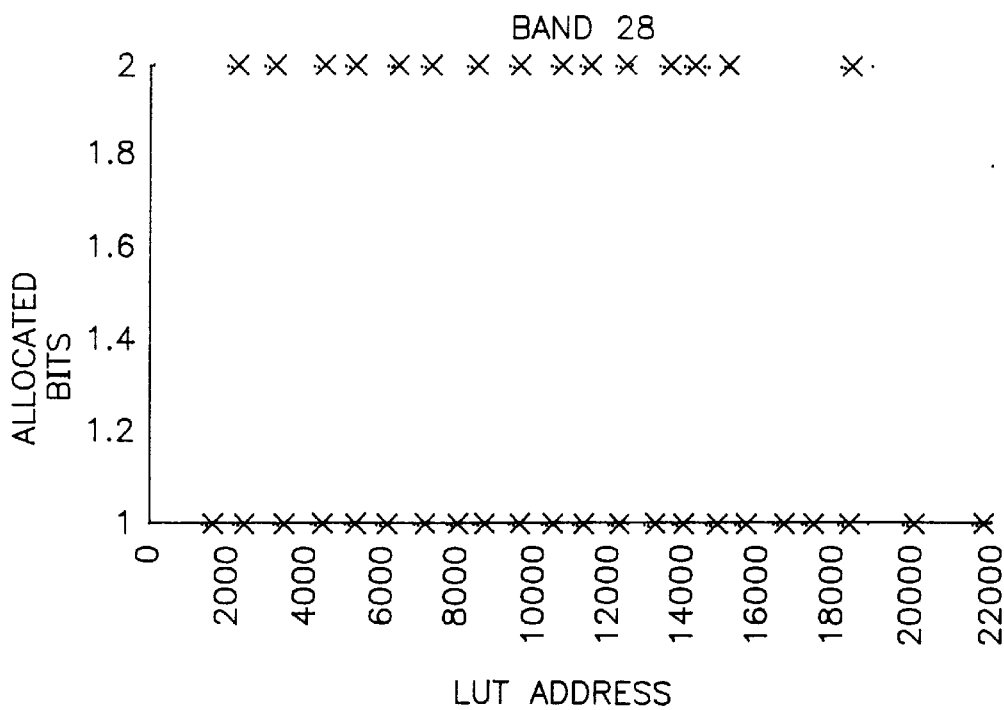
FIG. 10 shows the distribution of allocated bits in the look-up table for a band 28 according to addresses.

FIG. 12 is a block diagram of a digital audio encoding apparatus using a look-up table according to the present invention, which includes a frequency mapping part 121, a characteristics acquiring part 123, an LUT 125, and a bit allocating and quantizing part 127 and a frame packing part 129. FIG. 3B illustrates a method for encoding an audio signal using a look-up table.

The operation of the digital audio encoding apparatus using a look-up table according to the present invention will now be described with reference to FIG. 12 and FIG. 3B. First, step S10 an audio data is passed through the band analysis filter in the frequency mapping part 121 to divide the audio data into 32 frequency bands. Then, there exist 12 samples in each band in the case of the layer I and 36 samples in case of the layer II, respectively.

To obtain the address of LUT 125, in step S11 the characteristics acquiring part 123 calculates three characteristics, namely, a variance, a mean square root and a scale factor for an input signal for each band in the above-described method. The characteristics acquiring part 123 also sorts the characteristics in the order of the intensity of the characteristics.

In steps S13 and S14, the bit allocating and quantizing part 127 allocates bits for each band by using the LUT 125 obtained in the above-described method. In step S15, the bit allocating and quantizing part 127 compares the allocated bit number with the number of required bits to check whether there could be a bit remaining. Of course, when bits are allocated by the LUT 125, it is desirable to allocate bits so as to meet the number of required bits. Since any incidental adjustment work is not necessary, processing speed can be reduced significantly.

First, bits are allocated by the LUT 125. Then, in step S16 if the allocated bits exceed the required bits, the number of bits of the band to which the most bits are allocated is decreased by 1 bit and then is compared with that of required bits, for all bands. This process is repeatedly performed until the allocated bits do not exceed the required bits.

On the contrary, after allocating bits using the LUT 125, in steps S17 and S18, if the allocated bits are less than the required bits so that surplus bits can be allocated, the process will be performed as follows. Here, an increase band means a band where bits are to be increased. Also, a set means a list for storing such increase band separately. The algorithm is an example for layer I. In a first step, the initial value of a flag is set as zero (0) and the content of the set is initialized to −1. In a second step, a band with the largest scale factor is searched. If the searched band is not included in the set, the band is set as the increase band and the flag is changed into 1. In the third step, the increase band is stored in the set if the flag is 1. Also, if the flag is zero (0), it means that all bands are stored in the set, which also means that all bands are the increase bands once. In such a case, increase bands are again designated in the order of storage in the set. In other words, the increase band is again designated according to the order of larger scale factors until the number of required bits are satisfied. In a fourth step, the number of bits of the increase band is increased by 1 bit. In a fifth step, if the number of allocated bits for the current increase band is 1, the allocated bit is compared with the required bit again. If the number of bits does not exceed 30, the bits of the increase band is increased by 1 and the quantity of used bits is calculated and then the process returns to the first step. If the allocated bit of the current increase band is not 1, the quantity of used bits is only calculated and then the process returns to the first step. Here, 30 is decided as the standard because a total 30 bits are necessary. That is to say, since 2 bits, not 1 bit, should be increased to the band to which bits are first allocated, 24 bits are allocated to 12 samples and the scale factor information numbers 6 bits. On the other hand, a scale factor is used as the standard of the increase band in the second step. However, another characteristics such as a variance or a mean square root also can be used. In case of the layer II, since three scale factors exist in each band, the largest scale factor is used as the standard.

The bit adjusting process greatly influences upon the reduction of the overall performance time necessary for audio encoding process. In other words, since the numbers of repetition of the bit adjusting process is reduced by matching correctly the allocated bits using the LUT 125 with the required bits, the LUT 125 should be prepared correctly and reliably.

In practice, to test the performance efficiency of the present invention, the overall performance time was measured for twelve audio data. A SUN SPARC-10 was used under a UNIX system to conduct the experiment. Also, the audio data was obtained from a compact disc (CD).

The following Table 4 indicates the performance time of the encoding apparatus, in which the encoding method using the LUT proposed by the present invention and that using the existing MPEG algorithm are compared and the efficiencies thereof are compared.

TABLE 4

| Number | Data | MPEG (1/60 sec) | LUT (1/60 sec) | Efficiency improvement (%) |
|---|---|---|---|---|
| 1 | harpsi | 13763 | 7836 | 43.0 |
| 2 | jongseo | 16901 | 10079 | 40.4 |
| 3 | kenny | 22579 | 12797 | 43.3 |
| 4 | man | 12677 | 7536 | 40.6 |
| 5 | newyork | 19787 | 11140 | 43.7 |
| 6 | paul | 19429 | 10948 | 43.7 |
| 7 | sorpa | 12697 | 7484 | 41.1 |
| 8 | suhee | 18728 | 10966 | 41.4 |
| 9 | tri | 12823 | 8310 | 35.2 |
| 10 | vivaldi | 14059 | 8241 | 41.4 |
| 11 | whitney | 18688 | 11151 | 40.3 |
| 12 | woman | 12084 | 7345 | 39.2 |
| Mean |  | 16184 | 9486 | 41.4 |

In the above Table 4, each of twelve audio data is given by a specific name, the number expresses an actual performance time, and the efficiency improvement ($E_{imp}$) is obtained by the following equation (4).

$$E_{imp} = \frac{T_{MPEG} - T_{LUT}}{T_{MPEG}} \times 100(\%) \qquad (4)$$

where $E_{imp}$ represents efficiency improvement, $T_{MPEG}$ is the performance time of the MPEG algorithm and $T_{LUT}$ is that of the algorithm proposed by the present invention.

In the second embodiment of the present invention, these characteristics depending on the psychoacoustics model are prescribed as a sale factor and a square average.

The final output value of the psychoacoustics model 33 is an SMR, which represents the difference between a signal level and a masking level for each band. In order to obtain this value, the signal level is first calculated. For the psychoacoustics model 33, the signal level of each band is set as the larger value of the power for the relevant band and the power spectrum ($sf_{max}$) of the scale factor, which is written as:

$$Lsb(n) = MAX[\text{power}(n), 20\log(sf_{max}(n)*32768) - 10]dB \qquad (5)$$

where Lsb(n) is a sound pressure for a band n, which corresponds to a level S for SMR.

In the above equation (5), the factor of determining the signal level for each band is a scale factor and a power value. In the psychoacoustics model, the power is obtained through frequency conversion, which is, however, analogized in view of the time domain to be obtained as the square average of sample values for each band having passed the band analysis filter. Also, the scale factor which is the largest sample value in each band is directly obtained in the time domain.

Generally, if the power of an audio signal is large, more bits should be allocated. Therefore, it is considered that the power in view of the frequency domain is determined by the size of the sample values in the time domain. If such a point is taken into account, the scale factor as the largest value in each band is related to the power, and determines the allocated bit quantity.

In preparing the LUT using the above-described characteristics of the audio signals, the most important factor is how to use such characteristics in locating the addresses of the LUT. In other words, the method of preparing the LUT using these two characteristics, i.e., the scale factor and square average, will now be described.

The LUT in which the address for each band and allocated bit quantity are stored is used to reduce the time required for bit allocation. In other words, the addresses determined by the two parameters are searched from the LUT to allocate bits to the relevant band. According to the MPEG bit allocation method, bits are incremented one by one, starting from the band having the largest SMR value for each band obtained from the psychoacoustics model, by which relative SMR values are processed within one frame considering the correlativity for each band. Thus, in the present invention, in obtaining the addresses of the LUT, the concept of an occupation rate is introduced to obtain the relative value of the scale factor and square average for each band.

The occupation rate $SR_{sf}(n)$ for the scale factor of a band n is a value obtained by dividing the scale factor sf(n) of the band n by the sum of the scale factors sf of all bands, and is written as:

$$SR_{sf}(n) = \frac{sf(n)}{\Sigma ch \Sigma sbsf} \quad (6)$$

The occupation rate $SR_{pwr}(n)$ for the square average of the band n is a value obtained by dividing the square average pwr(n) of the band n by the sum of the square averages of all bands, and is written as:

$$SR_{pwr}(n) = \frac{pwr(n)}{\Sigma ch \Sigma sbpwr} \quad (7)$$

Here, all bands represent both channels, which is for connection with a joint stereo mode. The occupation rate is an index for indicating how much the value of a band is occupied in all bands. Thus, the occupation rate is a relative value in consideration of all values and is similar to the concept of repeated bit allocated loops of the MPEG.

A larger value of the thus-obtained scale factor for each band and the occupation rate of the square average is chosen to be used in obtaining the address of the relevant band. The reason of the foregoing is in that although these two characteristics may be used in calculating the addresses of all LUTs, the addresses become larger, which causes the overall LUT size to be larger. A similar processing to the psychoacoustics model in which as indicated in the above equation (5), of the two, the larger value is determined as the signal level of the relevant band, is also performed in the present invention.

The occupation rates are all less than 1, these values are converted into integers in the present invention using a 63-step scale factor mapping data, and then the addresses of the LUT are assigned. In such a case, the address having the largest value for the respective bands is 62.

After obtaining the final occupation rates for each band, the allocated bit quantities corresponding to these values are searched using as much audio data as possible, and then are stored in the LUT. In other words, the allocated bit quantities are searched through the audio data selected by the MPEG algorithm using the psychoacoustics model. At this time, the occupation rates for each band are obtained to then determine the mostly occupied bits as the corresponding bits of the occupation rates. FIG. 3 shows the method of preparing the LUT.

With respect to a band, for example, assuming that the allocated bit quantity by the psychoacoustics model is 7 at a band 0, and the occupation rate thereat is 5, the number of frequency is increased by one in the 7-bit region of address 5. Such a process is repeatedly performed with respect to various kinds of audio data to then determine the most frequent value as the allocated bit quantity of the relevant band. As will be indicated in the following Table 5, 8, 7, 0 and 0 are determined as the final allocated bit quantities of address 5, 30, 61 and 62. If the most frequent band numbers two, the upper bit is chosen.

TABLE 5

| Address | 0 | 1 | ... | 7 | 8 | ... | 15 | 16 |
|---|---|---|---|---|---|---|---|---|
| ... | ... | ... | ... | ... | ... | ... | ... | ... |
| 5 | 2 | 34 | ... | 1300 | 6543 | ... | 189 | 89 |
| . | | | | | | | | |
| . | | | | | | | | |
| 30 | 5 | 34 | ... | 5656 | 787 | ... | 689 | 560 |
| 31 | | ... | | | ... | | | |
| . | | | | | | | | |
| . | | | | | | | | |
| 61 | 5655 | 3417 | ... | 45 | 5 | ... | 0 | 0 |
| 62 | 6789 | 4562 | ... | 5 | 8 | ... | 0 | 0 |

The thus-obtained LUT stores 1984 kinds of information in total, i.e., each 62 for 32 bands. This is quite a large quantity of about 25 kbytes, an optimizing process is added to use the memory more efficiently by reducing the overall size of the memory. In other words, like the addresses 61 and 62 of Table 5, if the final allocated bit quantity is zero, this is not stored in the LUT. Otherwise, if the allocated bit quantities of consecutive addresses are the same with each other, only the allocated bit quantity of the address having a smaller value is stored in the LUT. By doing so, only the address of the boundary at which bit values are changed is used as the information. Such an optimizing process greatly reduces the capability of the memory for storing the LUTs.

Then, the audio encoding process using the thus-prepared LUT will be explained with reference to FIG. 12.

To obtain the address of the LUT 125, the characteristics acquiring part 123 calculates occupation rates for the scale factor and square average for an input signal for each band in the above-described method, and selects the largest value to set the same as the address of the LUT 125.

The bit allocating and quantizing part 127 allocates bits for each band using the LUT 125 obtained in the above-described method and then compares the allocated bit number with the number of required bits to check whether there could be a bit remainder thereby adjusting the overall bit usable quantity. Of course, when bits are allocated by the LUT 125, it is desirable to allocate bits so as to meet the number of required bits. Since any incidental adjustment work is not necessary, a processing speed can be reduced significantly.

First, bits are allocated by the LUT 125. The processing in case of exceeding the required bits will now be described. If the allocated bits exceed the required bits, the number of bits of the band to which the most bits are allocated is decreased by 1 bit, starting from the band to which one more bit is allocated while having the smallest occupation rate. This process is repeatedly performed until the allocated bits do not exceed the required bits. At this time, the once-reduced band is set with the lowest priority so that the bits are evenly reduced for all bands. Bit decreasing starts from the higher bands because important information is generally much concentrated on the lower frequency area.

On the contrary, after allocating bits using the LUT 125, if the allocated bits are less than the required bits so that surplus bits can be allocated, the lower bands are searched and then bits are increased one by one from the band not exceeding the maximum allocated bit quantity while having the largest occupation rate. The process is repeated until the allocated bits do not exceed the required bits.

The bit adjusting process greatly influences the reduction of the overall performance time necessary for audio encoding process. In other words, since the numbers of repetition of the bit adjusting process is reduced by matching correctly the allocated bits using the LUT 125 with the required bits, the LUT 35 should be prepared correctly and with reliability.

Meanwhile, a joint-stereo mode is introduced from the human psychoacoustics characteristics and generally utilize the fact that the higher the frequency is, the poorer the capability of seizing the position of an audio source accurately becomes. Generally, the hardware complexity of the joint-stereo mode is almost the same as that of the stereo-encoding mode. Delay time of the joint-stereo mode is scarcely changed, compared to that of the stereo encoding mode. The main purpose of this mode is to enhance the audio quality and encode the same, by which the bit transmission rate is reduced to about 10~30Kbps.

The joint-stereo encoding method standardized in the MPEG audio will now be described, in which a specific band is decided and samples are not encoded in the bands beyond the specific band but the sum thereof is obtained to encode only one sample. Also, the scope of the specific band to be encoded by the joint-stereo encoding method is determined by deciding the allocated bit quantity for lowering the noise of each band to a mask level or below, checking whether the allocated bits are more than the required bits and then selecting one of four bands (4, 8, 12 and 16). In the thus-decided joint-stereo band, the larger allocated bit quantity of left and right channels is selected to then be quantized.

In the encoding process by adopting such concepts to the LUT of the present invention, the important factor is to determine the scope of the bands to be encoded by the joint-stereo encoding method. In the present invention, the occupation rates for each band are searched and then it is checked how many bands exceed 99% in the sum of the occupation rates among all bands. Also, in the bands to be encoded by the joint-stereo encoding method, the larger value of each scale factor and square average for left and right channels is selected to be used in obtaining the occupation rate.

In obtaining the respective occupation rates, since the sum of all bands becomes smaller than that by the stereo encoding method, the respective occupation rates become larger than those by the stereo encoding method. Therefore, in case of the encoding by the joint-stereo encoding method, since different addresses are calculated, the allocated bit quantity becomes different. Thus, the encoding by both stereo encoding method and joint-stereo encoding method is allowed by using a single LUT.

In practice, to test the performance efficiency of the present invention, the overall performance time was measured for twelve audio data. A SUN SPARC-10 was used under a UNIX system to perform the method according to the present invention. Also, the audio data was obtained from a compact disc (CD).

The following Table 6 indicates the performance time of the encoding apparatus, in which the encoding method using the LUT proposed by the present invention and that using the existing MPEG algorithm are compared and the efficiencies thereof are compared.

TABLE 6

| Number | Data | MPEG (1/60 sec) | LUT (1/60 sec) | Efficiency improvement (%) |
| --- | --- | --- | --- | --- |
| 1 | abba | 19037 | 11895 | 37.5 |
| 2 | ensemble | 10636 | 10079 | 32.4 |
| 3 | glockenspiel1 | 18234 | 12797 | 36.3 |
| 4 | glockenspiel2 | 12957 | 7536 | 40.1 |

TABLE 6-continued

| Number | Data | MPEG (1/60 sec) | LUT (1/60 sec) | Efficiency improvement (%) |
| --- | --- | --- | --- | --- |
| 5 | gpiano1 | 11486 | 11140 | 35.3 |
| 6 | gpiano2 | 25753 | 10948 | 34.7 |
| 7 | gpiano3 | 43178 | 7484 | 47.1 |
| 8 | gpiano4 | 22878 | 10966 | 49.9 |
| 9 | orchestra | 44412 | 8310 | 49.9 |
| 10 | tri1 | 37654 | 8241 | 52.2 |
| 11 | tri2 | 27692 | 11151 | 49.2 |
| Mean | | 24902 | 13866 | 44.3 |

In the above Table 6, each of twelve audio data is given by a specific name, the number expresses an actual performance time, and the efficiency improvement ($E_{imp}$) is obtained by the above equation (4).

First, the performance speed of the algorithm proposed by the present invention will be described. As shown in Table 4 and Table 6, although there is a little difference depending on audio data, it is understood that the speed improvement of about 41.4% and 44.3% could be accomplished in the first and second embodiments, respectively, compared to the existing method. This means the improvement of a real time process of the encoding apparatus. Therefore, the processing delay in the encoding apparatus is decreased by a hardware implementation. However, an allocated bit process proposed by the present invention is realized by not only the LUT but also by a subsequent process, i.e., a step of processing surplus or deficient bits (an allocated bit adjusting step). The overall performance time can be reduced according to the allocated bit adjusting step.

In view of sound quality of an audio signal, it is nearly the same as that of the existing MPEG algorithm. In other words, in the layer I, the CD sound quality which is nearly the same as the original sound can be obtained to a limit of 128 kbps, and 96 kbps in the layer II.

On the other hand, to find the efficiency difference between the algorithm proposed by the present invention and the conventional MPEG algorithm, the efficiency evaluation method using the psychoacoustics model proposed by Karlheinz Brandenburg is adopted. This method adopts an NMR as the standard measurement. If the NMR is a negative value, the noise is below a mask level. Thus, the noise is low enough to reproduce the audio signal as a more clear sound quality.

Figure 13:
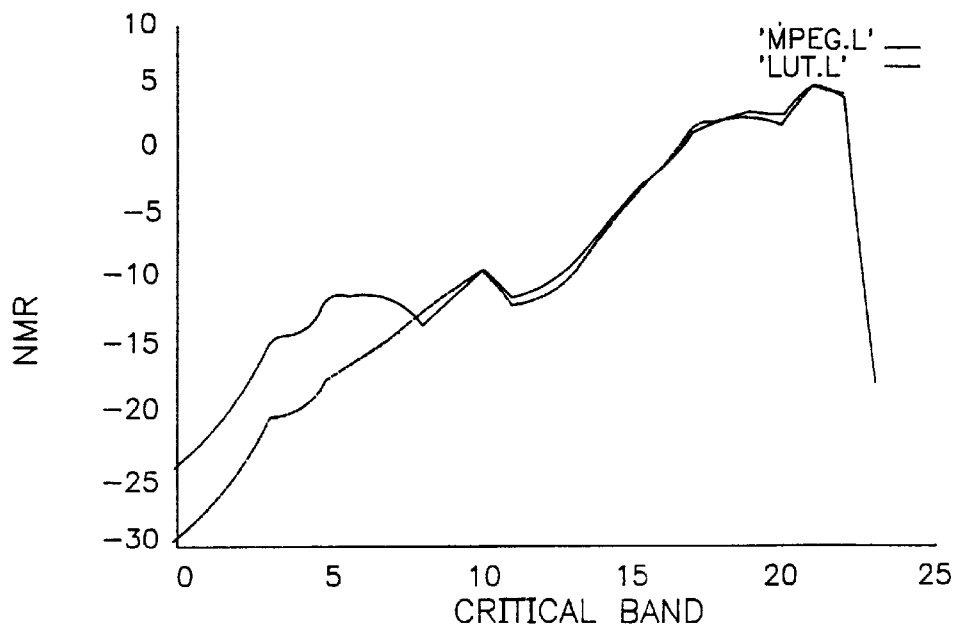
FIG. 13 is a graph for comparing the efficiency of an MPEG with respect to an NMR of a left channel with that of the encoding apparatus according to the present invention.
Figure 14:
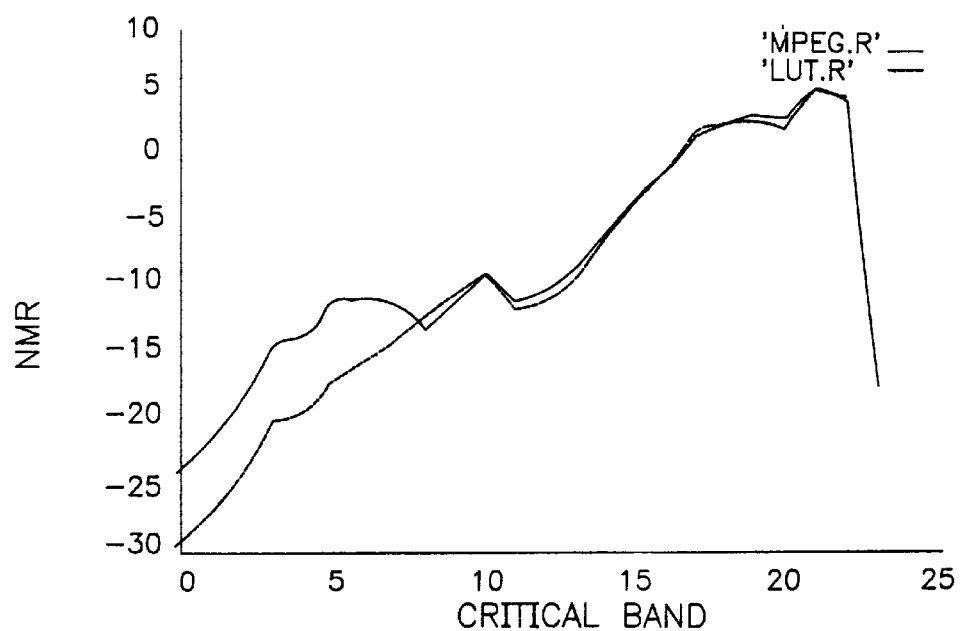
FIG. 14 is a graph for comparing the efficiency of an MPEG with respect to an NMR of a right channel with that of the encoding apparatus according to the present invention.

FIGS. 13 and 14 are graphs for comparing the evaluation result for two algorithms for the respective channels, showing that the LUT method is stronger against the noise characteristics for a lower frequency domain than the MPEG method. In other words, even if the required bits are the same, the usage of bits in the encoding method using the LUT could be established more effectively than that in the conventional method.

As the above mentioned, since a psychoacoustics model is not used in the digital audio encoding method and apparatus using the look-up table according to the present invention, the feasibility of a real-time processing is increased by a hardware implementation thereof, by greatly reducing the operation time delay in the encoding apparatus. One of actually applicable examples is a hardware for a computer amusement. In this case, although sound quality is not so important, since a quick real-time process is required, the digital audio encoding method and apparatus using the look-up table according to the present invention is very useful.

Also, the psychoacoustics model is difficult to realize in actual hardware due to its complicated algorithms. Further, in the present invention, as the most influential factor in determining the value of the encoding apparatus, an LUT is adopted instead of the psychoacoustics model. Thus, the hardware can be easily implemented by adding only a memory, and the expense for the encoding apparatus is also reduced.

Also, according to the present invention, since a very reduced-size chip is obtained, compared with the existing MPEG encoding apparatus, the present invention can be applied to small devices such as a portable camera, etc. Nowadays, it is usual to load MPEG chips on computers. Thus, since the apparatus according to the present invention is perfectly compatible with the MPEG apparatus, the size of the board installed within the computer can be reduced, thereby manufacturing the light, thin, short and small type of products.

What is claimed is:

1. A digital audio encoding method comprising the steps of:
   dividing a time domain input audio signal into a number of equal width frequency bands;
   determining a number of allocated bits for each frequency band including:
     calculating a variance, a root mean squared value, and a scale factor for each frequency band,
     determining order numbers for the variance, the root mean squared value, and the scale factor for each band according to relative magnitudes of the variances, the root mean squared values, and the scale factors of all of the frequency bands,
     calculating an address for each frequency band based on the order numbers, and
     extracting the number of allocated bits from a look-up table using the address calculated for each band;
   allocating bits to each frequency band corresponding to the extracted number of allocated bits and quantizing the allocated bits; and
   forming a quantized audio signal from the quantized bits as a bitstream.

2. The method of claim 1 further comprising generating the look-up table including:
   (a) dividing a time domain test input audio signal into the number of frequency bands;
   (b) calculating a variance, a root mean squared value, and a scale factor for each frequency band;
   (c) determining order numbers for the variance, the root mean squared value, and the scale factor for each frequency band according to relative magnitudes of the variances, the root mean squared values, and the variances of all of the frequency bands of the test input audio signal;
   (d) determining an allocated bit number for each band using a psychoacoustic model;
   (e) calculating an address corresponding to each order number;
   (f) storing the allocated bit numbers for each frequency band at the address corresponding to the order number for each frequency band;
   (g) repeating steps (a)–(f) for a plurality of test input audio signals and storing a plurality of allocated bit numbers at each address; and
   (h) generating the look-up table by storing each address and the allocated bit number occurring most frequently at each address.

3. The digital audio encoding method as claimed in claim 2 comprising the step of excluding addresses having an allocated bit number of zero from the look-up table and allocating a zero bit to the addresses excluded from the look-up table, thereby optimizing bit allocation.

4. The digital audio encoding method as claimed in claim 1 comprising the step of comparing a number of required bits with a number of actually allocated bits, after allocating the bits using the look-up table, and adjusting the allocated bits according to the comparison result.

5. A digital audio encoding method comprising the steps of:
   dividing a time domain input stereo audio signal into a number of equal width frequency bands;
   determining a number of allocated bits for each frequency band including:
     calculating a scale factor and a square average value for each frequency band,
     determining occupation rates for the scale factor and the square average value for each band, and
     comparing the occupation rates for each frequency band and utilizing the larger occupation rate to calculate an address for each frequency band,
     extracting the allocated bit number from a pre-prepared look-up table using the address calculated for each frequency band;
   allocating bits corresponding to the extracted allocated bit numbers for the frequency bands and quantizing the allocated bits; and
   forming a quantized audio signal from the quantized bits as a bitstream.

6. The method of claim 4 comprising generating the look-up table including:
   (a) dividing a test audio input signal into a plurality of frequency bands;
   (b) calculating a scale factor and a square average value for each frequency band;
   (c) calculating occupation rates corresponding to the scale factor and the square average value for each frequency band;
   (d) comparing the occupation rates for each frequency band and calculating an address for each frequency band based on the larger occupation rate;
   (e) determining an allocated bit number for each frequency band using a psychoacoustic model;
   (f) storing the allocated bit numbers for each frequency band at the address corresponding to each frequency band;
   (g) repeating steps (a)–(f) and storing a plurality of allocated bit numbers at each address; and
   (h) generating the look-up table by storing each address and the number allocated bits occurring most frequently at each address.

7. The digital audio encoding method as claimed in claim 6, comprising the step of excluding addresses having an allocated bit number of zero from the look-up table, and storing only a boundary portion where boundary values are changed, thereby optimizing bit allocation.

8. The digital audio encoding method as claimed in claim 5 comprising the step of comparing a number of required bits with a number of actually allocated bits, after allocating the bits using the look-up table, and adjusting the allocated bits according to the comparison.

9. The digital audio encoding method as claimed in claim 6, comprising:
   increasing the number of allocated bits in one-bit increments, starting from a lower frequency band to a first frequency band having a largest occupation rate, if fewer than a required number of bits are allocated, and decreasing bits in one-bit increments, starting from a higher frequency band to a second frequency band having a smallest occupation rate, if more bits are allocated than the required number of bits.

10. The digital audio encoding method as claimed in claim 4, comprising determining allocated bit numbers using the look-up table in a stereo mode and a joint-stereo mode without changing the look-up table.

11. The digital audio encoding method as claimed in claim 10, comprising locating a boundary of frequency bands to be encoded by the joint-stereo mode by obtaining the occupation rates for each frequency band.

12. A digital audio encoding apparatus for encoding an input audio signal comprising:

a frequency mapping part for dividing a time domain input audio signal into a first number of equal frequency bands;

a look-up table including allocated bit numbers for encoding a frequency band, the allocated bit numbers being stored at addresses corresponding to a magnitude order of characteristics of the frequency band, the characteristics including a variance, a scale factor, and a root mean squared value;

a characteristic acquiring part for determining the addresses of the look-up table according to the magnitude order of the characteristics of the input audio signal, the characteristic acquiring part including:

a calculating part for calculating the characteristics of each frequency band of the input audio signal, an order number determining part for determining order numbers for each frequency band according to the relative magnitudes of the characteristics of each frequency band with respect to all of the frequency bands, and an address calculating part for calculating an address for extracting an allocated bit number from the look-up table based on the order numbers for the characteristics of each band;

a bit allocating and quantizing part for allocating bits corresponding to the addresses to each frequency band in the look-up table and quantizing the allocated bits; and a frame packing part for forming as a bitstream a quantized audio signal from the quantized bits.

13. The digital audio encoding apparatus as claimed in claim 12 including an optimizing part for excluding the addresses from the look-up table having an allocated bit number of zero.

14. The digital audio encoding apparatus as claimed in claim 12, wherein said bit allocating and quantizing part optimizes bit allocation by allocating a zero bit to addresses not in the look-up table.

15. The digital audio encoding apparatus as claimed in claim 12, wherein said bit allocating and quantizing part compares a number of required bits with a number of actually allocated bits and adjusts bit allocation according to the comparison.

16. The digital audio encoding apparatus as claimed in claim 12, wherein the characteristics of the audio signal include a scale factor and a square average.

17. The digital audio encoding apparatus as claimed in claim 16, wherein the addresses of the look-up table are calculated using the occupation rate of the scale factor in each frequency band, for all bands and the square average.

* * * * *

UNITED STATES PATENT AND TRADEMARK OFFICE
CERTIFICATE OF CORRECTION

PATENT NO.  : 5,864,802
DATED       : January 26, 1999
INVENTOR(S) : Kim et al.

It is certified that error appears in the above-identified patent and that said Letters Patent is hereby corrected as shown below:

Column 16, Line 31, change "4" to --5--;

Line 65, change "6" to --8--;

Column 17, Line 8, change "4" to --5--.

Signed and Sealed this

Twentieth Day of July, 1999

Attest:

Q. TODD DICKINSON

*Attesting Officer*                    *Acting Commissioner of Patents and Trademarks*